Dec. 12, 1950 E. F. HALL 2,533,580

CALCULATOR

Filed Sept. 17, 1948 2 Sheets-Sheet 1

Elijah F. Hall
INVENTOR.

BY Clarence A. O'Brien
and Harvey B. Jacobson
Attorneys

Dec. 12, 1950 E. F. HALL 2,533,580

CALCULATOR

Filed Sept. 17, 1948 2 Sheets-Sheet 2

Elijah F. Hall

INVENTOR.

BY Clarence A. O'Brien and Harvey B. Jacobson

Attorneys

Patented Dec. 12, 1950

2,533,580

UNITED STATES PATENT OFFICE 2,533,580

CALCULATOR

Elijah F. Hall, Reidsville, N. C.

Application September 17, 1948, Serial No. 49,784

1 Claim. (Cl. 235—88)

This invention relates to a calculator and more particularly to a "co-insurance calculator."

Fire insurance policies employed for the protection of business property or goods frequently contain what is known as a co-insurance clause which requires that the insured shall maintain at all times insurance on each item of property of not less than a definite percent of the actual cash value of the property.

The primary object of this invention is rapidly to apprize the insured as to the percentage of the actual value of the insured property that is covered by his insurance policy.

The above and other objects may be attained by employing this invention which embodies among its features a base having on one face an annular row of indicia, an intermediate disc mounted on the base to rotate in concentric relation with the annular row of indicia on said base, said intermediate disc being of lesser diameter than the annular row of indicia, a radial tab on the intermediate disc overlying the annular row of indicia on the base, said tab bearing an index mark for cooperation with said annular row of indicia, an arcuate row of indicia on the intermediate disc spaced inwardly from the periphery thereof and lying concentric with the annular row of indicia on the base, a top disc mounted on the base to rotate in concentric relation with the intermediate disc, said top disc having a window therein through which a group of indicia of the arcuate row of indicia may be viewed, an index mark on the top disc for cooperation with the indicia visible through the window, a radial tab on the top disc overlying the annular row of indicia on the base, and an index mark carried by the last-mentioned tab for cooperation with the annular row of indicia on the base.

Other features include an arm mounted on the base to rotate in concentric relation with the annular row of indicia, said arm carrying an index mark which cooperates with the annular row of indicia on the base, and means adjustably coupling the tab on the top disc with the arm to cause the arm to move in unison with the top disc.

Figures 1, 2:
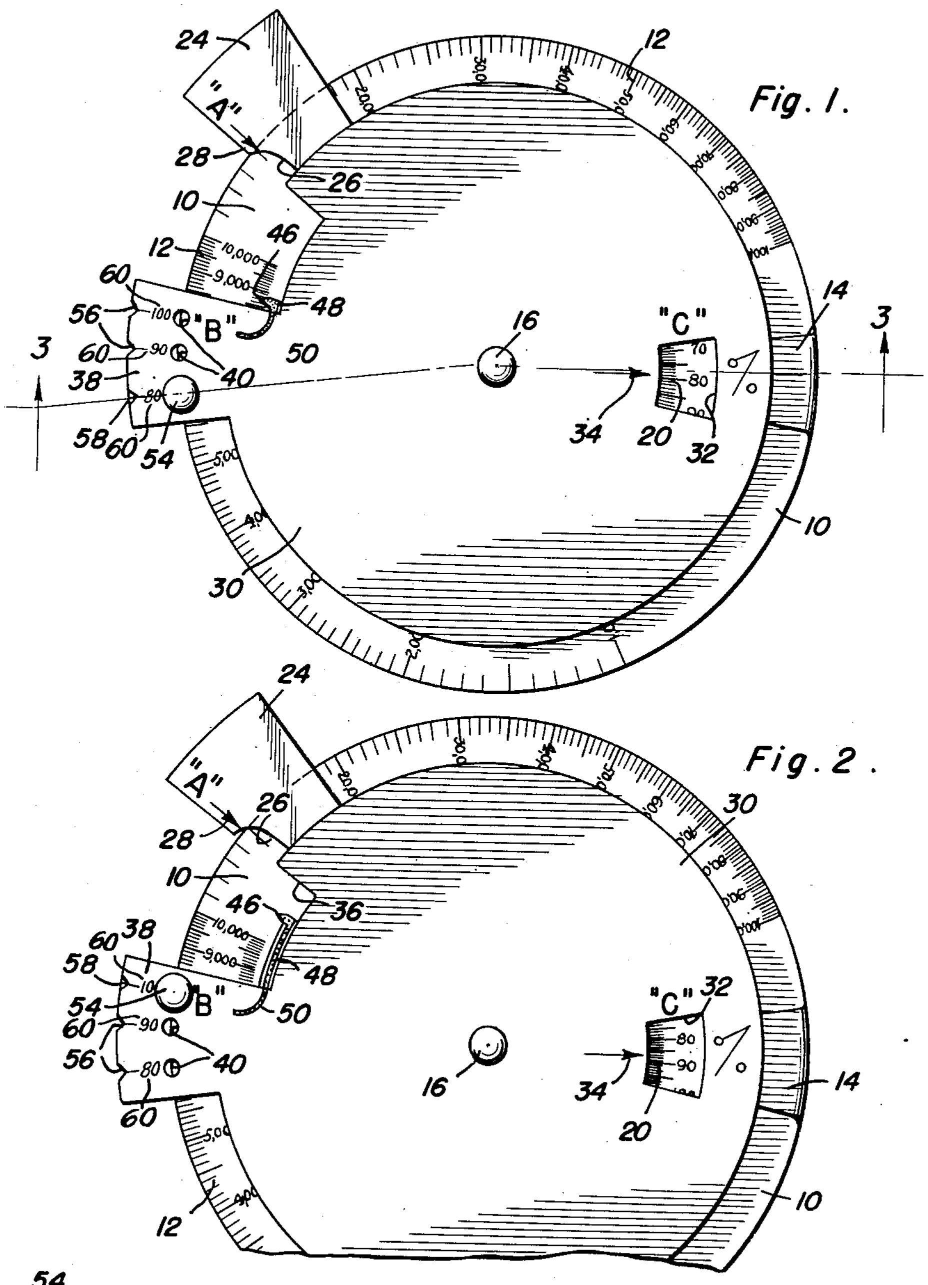
Figure 1 is a top plan view of a calculator embodying the features of this invention.
Figure 2 is a view similar to Figure 1 showing the index mark on the arm moved to a different position than that illustrated in Figure 1.
Figure 3:
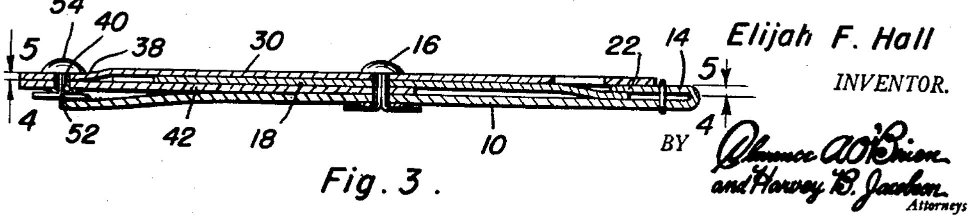
Figure 3 is a transverse sectional view taken substantially along the line 3—3 of Figure 1.
Figure 4:
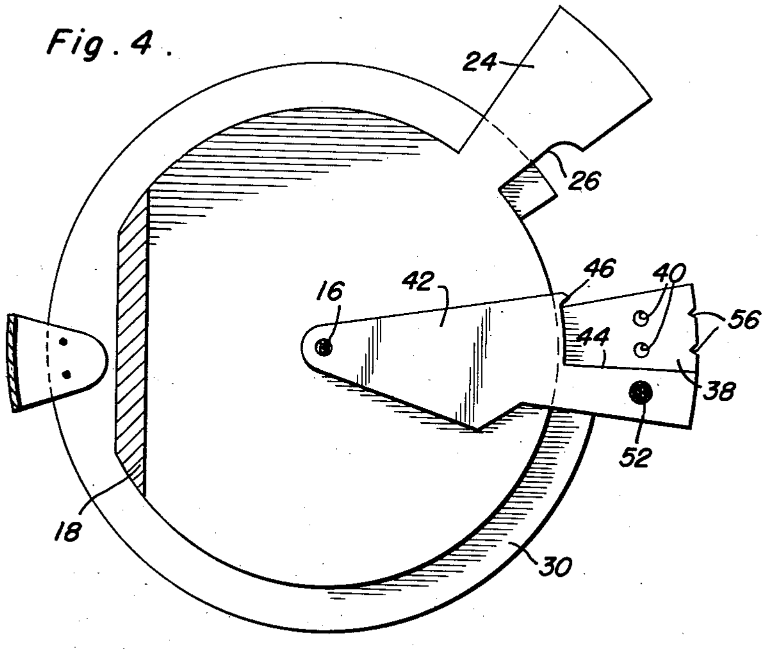
Figure 4 is a horizontal sectional view taken substantially along the line 4—4 of Figure 3 with the parts reversed; and, Figure 5 is a horizontal sectional view taken substantially along the line 5—5 of Figure 3.
Figure 5:
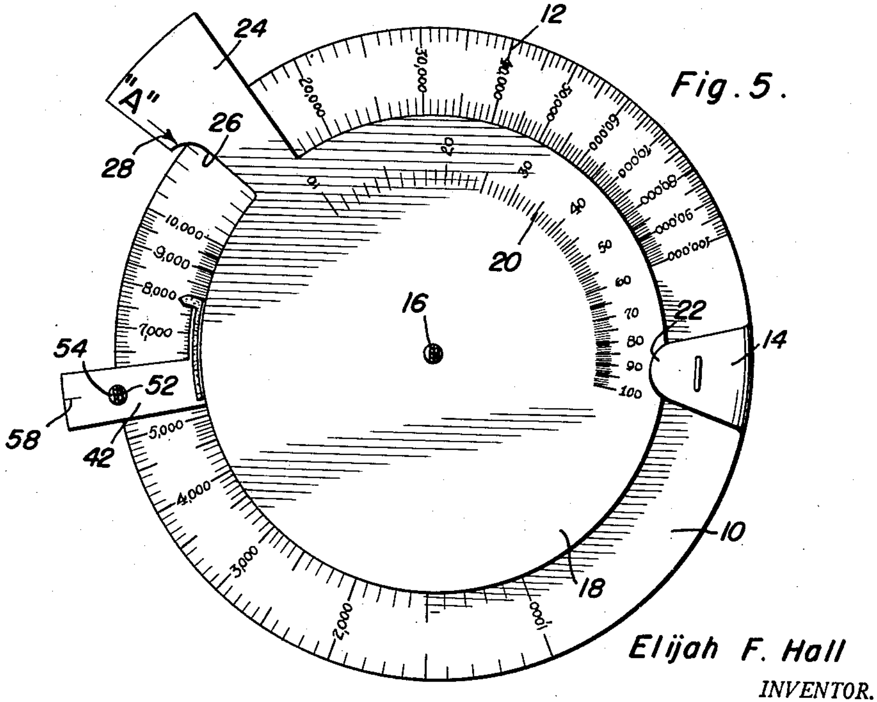

Referring to the drawings in detail, a base 10 is provided with an annular row of indicia 12, and carries a stop 14.

Rotatably supported on the base 10 for rotation about a center pin 16 in concentric relation with the annular row of indicia 12 is an intermediate disc 18 carrying an arcuate row of indicia 20 which are spaced inwardly from its periphery. The peripheral edge of the disc 18 preferably rides beneath a lip 22 carried by the stop 14, and formed on the disc 18, and projecting radially therefrom is a tab 24 which overlies a portion of the annular row of indicia 12 and projects outwardly beyond the outer edge of the base 10. This tab is provided with a cut-out 26 through which a group of indicia of the annular row of indicia 12 is visible, and carried on the top surface of the tab, and pointing radially toward the axis thereof is an index mark 28 which is adapted to cooperate with the indicia 12 when the device is in use.

Rotatably supported on the center pin 16 above the intermediate disc 18 is a top disc 30 which is provided with a window 32 through which a group of indicia of the arcuate row of indicia 20 is visible. A suitable index mark 34 is carried on the top face of the top disc 30 for cooperation with the indicia 20, as will be readily understood upon reference to Figures 1 and 2. The top disc is of slightly greater diameter than the intermediate disc 18 and is formed in its periphery with a notch 36 adjacent one end of which is formed a radially extending tab 38 which projects outwardly beyond the outer edge of the annular row of indicia 12 of the base 10 and is provided with an arcuate row of spaced openings 40, the purpose of which will presently appear. The notch 36 in the top disc 30 is so proportioned as to render readily visible a group of indicia of the annular row of indicia 12 as will be readily understood upon reference to Figure 1.

Mounted for rotation on the center pin 16 between the intermediate disc 18 and the base 10 is an arm 42 which extends radially beyond the edge of the annular row of indicia 12 and terminates coincidentally with the outermost end of the tab 38. This arm is cut out as at 44 adjacent its outer end and is equipped with a pointer 46 which partially overlies the inner periphery of the row of indicia 12 for cooperation therewith. A suitable index mark 48 is printed on the exposed face of the arm 42 for cooperation with a suitable index mark 50 carried by the tab 38, and the arm 42 is pierced with an opening 52 for the reception of a fastener 54 which projects through one of the openings 40 in the tab 38 and holds the arm 42 against movement relative to the top disc 30. In this way the arm 42 is adjustably connected with the tab 38 so that the index pointer 46 will be held in proper relation with the disc 30 according to the percentage of co-insurance coverage. In the preferred form of the invention, the extreme outer end of the tab 38 is provided with a group of notches 56 which align radially with the openings 40 and through which an index mark 58 carried by the arm 42 is visible. The tab carries on its obverse face a group of indicia 60, one for each notch 56 showing the percentage of co-insurance held by the insured.

By mounting the arm 42 between the intermediate disc 18 and the base 10, it will be seen that arrest of movement of both the intermediate disc 18 and the arm 42 is achieved by the stop 14 so that the correct relationship of arm 42 and disc 18 is preserved.

In use, when it is desired to calculate the co-insurance coverage of a given policy, the fastener 54 is removed from its position in the opening 52 and one of the openings 40, and the arm is shifted so that index 58 aligns with the apex of the notch 56 adjacent the percentage of co-insurance coverage shown in indicia 60 on tab 38. With the arm in this position the opening therein aligns with the opening 40 in the tab 38 adjacent the indicium selected to show the percentage of coverage. The fastener 54 is then passed through the aligned openings 40 and 52 in the tab 38 and arm 42, respectively, thus holding the pointer 46 in advanced or retracted position relative to the tab 38. The tab 24 is then moved to rotate the disc 18 about the center pin 16 to a point on the annular row of indicia on the base 10 indicating the value of the goods insured with the index mark 28 pointing to the value. The tab 38 is then moved to rotate the disc 30 about the center pin 16 until the pointer 46 points to the amount of insurance coverage. In this position the percentage of coverage may be determined by reading the index 34 against the group of indicia visible through the window 32, and in this way a rapid determination of the percentage of coverage may be obtained.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

A calculator comprising a base having on one face an annular row of indicia, an intermediate disc mounted on the base to rotate in concentric relation with the annular row of indicia on the base, said intermediate disc being of lesser diameter than the annular row of indicia, a radial tab on the intermediate disc overlying the annular row of indicia on the base, said tab bearing an index mark for cooperation with said annular row of indicia, an arcuate row of indicia on the intermediate disc spaced inwardly from the periphery thereof and lying concentric with the annular row of indicia on the base, a top disc mounted on the base to rotate in concentric relation with the intermediate disc, said top disc having a window therein through which a group of indicia of the arcuate row of indicia may be viewed, an index mark on the top disc for cooperation with the indicia visible through the window, a radial tab on the top disc overlying the annular row of indicia on the base, an arm mounted on the base to rotate in concentric relation with the annular row of indicia, said arm carrying an index mark which cooperates with the annular row of indicia on the base and means adjustably coupling the tab on the top disc with the arm to cause the arm to move in unison with the top disc.

ELIJAH F. HALL.

REFERENCES CITED

The following references are of record in the file of this patent:

UNITED STATES PATENTS

| Number | Name | Date |
|---|---|---|
| 1,171,753 | Serrell | Feb. 15, 1916 |
| 1,262,635 | Cady | Apr. 16, 1918 |
| 1,397,944 | Dazell | Nov. 22, 1921 |
| 2,422,663 | Field | June 24, 1947 |

FOREIGN PATENTS

| Number | Country | Date |
|---|---|---|
| 326,860 | Great Britain | Mar. 24, 1930 |